US011120523B1

United States Patent
Gayatri et al.

(10) Patent No.: US 11,120,523 B1
(45) Date of Patent: Sep. 14, 2021

(54) VEHICLE PASSENGER DETECTION SYSTEM AND METHOD

(71) Applicant: Conduent Business Services, LLC, Florham Park, NJ (US)

(72) Inventors: Vinuta Vishweshwar Gayatri, Karnataka (IN); Manasa Kolla, Puducherry (IN)

(73) Assignee: Conduent Business Services, LLC, Florham Park, NJ (US)

( * ) Notice: Subject to any disclaimer, the term of this patent is extended or adjusted under 35 U.S.C. 154(b) by 7 days.

(21) Appl. No.: 16/817,102

(22) Filed: Mar. 12, 2020

(51) Int. Cl.
*G06T 3/00* (2006.01)
*G06K 9/00* (2006.01)

(52) U.S. Cl.
CPC ........ *G06T 3/0093* (2013.01); *G06K 9/00228* (2013.01); *G06K 9/00362* (2013.01)

(58) Field of Classification Search
CPC .............. G06T 3/0093; G06K 9/00228; G06K 9/00362
See application file for complete search history.

(56) References Cited

U.S. PATENT DOCUMENTS

| | | | |
|---|---|---|---|
| 7,436,315 B2 | 10/2008 | Kamizono et al. | |
| 8,284,042 B2 | 10/2012 | Rao et al. | |
| 8,509,997 B2 | 8/2013 | Sorimachi | |
| 10,088,846 B2 | 10/2018 | Gao et al. | |
| 10,480,992 B2 | 11/2019 | Sorimachi | |
| 2003/0235325 A1* | 12/2003 | Ray | G06T 1/0035 382/100 |
| 2009/0262987 A1* | 10/2009 | Ioffe | G06T 5/005 382/118 |
| 2015/0363655 A1 | 12/2015 | Artan et al. | |
| 2017/0178287 A1 | 6/2017 | Anderson | |

(Continued)

FOREIGN PATENT DOCUMENTS

CA 2592511 C 7/2006

OTHER PUBLICATIONS

Neustaedter, C., & Greenberg, S. (2003). The design of a context-aware home media space for balancing privacy and awareness. In A. Dey, A. Schmidt, & J. McCarthy (Eds.), UbiComp 2003: Ubiquitous Computing (pp. 297-314). Springer Berlin Heidelberg vol. 2864 of Lecture Notes in Computer Science.

(Continued)

*Primary Examiner* — Mark Roz
(74) *Attorney, Agent, or Firm* — Ortiz & Lopez, PLLC; Kermit D. Lopez; Luis M. Ortiz

(57) ABSTRACT

A method and system for image processing of an image captured by an image-capturing device, can involve dividing a region of interest in an image into blocks, wherein the image is captured by an image-capturing device. The region of interest can be associated with one or more faces in the image, and a resulting division of the dividing of the region of interest may be non-uniform. A minimum block size can be defined and the coordinates of each block after dividing of the region of interest in the image into the blocks. The one or more faces in the image can be redacted and reconstructed using the coordinates. In addition, redacting and reconstructing of the image is reversible for use with detecting the one or more faces in the image. The coordinates can specify top left coordinates and bottom right coordinates of each block.

20 Claims, 5 Drawing Sheets

(56) References Cited

U.S. PATENT DOCUMENTS

2019/0388012 A1    12/2019    Matsuo et al.
2019/0392264 A1    12/2019    Wang et al.

OTHER PUBLICATIONS

Zhang, C., Rui, Y., & ei He, L. (2006). Light weight background blurring for video conferencing applications. In Image Processing, 2006 IEEE International Conference on (pp. 481-484).

Neustaedter, C., Greenberg, S., & Boyle, M. (2006). Blur filtration fails to preserve privacy for home-based video conferencing. Computer-Human Interaction, ACM Transactions on, 13 , 1-36.

Frome, A., Cheung, G., Abdulkader, A., Zennaro, M., Wu, B., Bissacco, A., Adam, H., Neven, H., & Vincent, L. (2009). Large-scale privacy protection in google street view. In Computer Vision, 2009 IEEE 12th International Conference on (pp. 2373-2380).

Boyle, M., Edwards, C., & Greenberg, S. (2000). The ffects of filtered video on awareness and privacy. In Computer supported cooperative work, Proceedings of the 2000 ACM conference on CSCW '00 (pp. 1{10). New York, NY, USA: ACM.

Kitahara, I., Kogure, K., & Hagita, N. (2004). Stealth vision for protecting privacy. In Pattern Recognition, 2004. ICPR 2004. Proceedings of the 17th International Conference on (pp. 404{407). vol. 4.

Boult, T. (2005). PICO: Privacy through invertible cryptographic obscuration. In Computer Vision for Interactive and Intelligent Environment, 2005 (pp. 27-38). IEEE.

Bertalmio, M., Sapiro, G., Caselles, V., & Ballester, C. (2000). Image inpainting. In Computer Graphics and Interactive Techniques, Proceedings of the 27th Annual Conference on SIGGRAPH '00 (pp. 417-424). New York, NY, USA:ACM Press/Addison-Wesley Publishing Co.

Kokaram, A., Morris, R., Fitzgerald, W., & Rayner, P. (1995). Interpolation of missing data in image sequences. Image Processing, IEEE Transactions on, 4 , 1509-1519.

Abraham, A. R., Prabhavathy, K. A., & Shree, D. J. (2012). A survey on video inpainting. International Journal of Computer Applications, 56 , 43-47.

Newton, E., Sweeney, L., & Malin, B. (2005). Preserving privacy by deidentifying face images. Knowledge and Data Engineering, IEEE Transactions on, 17 , 232-243.

Spanos, G. A., & Maples, T. B. (1995). Performance study of a selective encryption scheme for the security of networked, real-time video. In International Conference on Computer Communications and Networks.

Zeng, W., & Lei, S. (2003). Efficient frequency domain selective scrambling of digital video. Multimedia, IEEE Transactions on, 5 , 118-129.

Tang, L. (1996). Methods for encrypting and decrypting MPEG video data efficiently. In Multimedia, Proceedings of the fourth ACM international conference on (pp. 219-229). ACM.

Yabuta, K., Kitazawa, H., & Tanaka, T. (2005). A new concept of security camera monitoring with privacy protection by masking moving objects. In Y.-S. Ho, & H. Kim (Eds.), Advances in Multimedia Information Processing—PCM 2005 (pp. 831-842). Springer Berlin / Heidelberg vol. 3767 of Lecture Notes in Computer Science.

Xiangdong, L., Junxing, Z., Jinhai, Z., & Xiqin, H. (2008). Image scrambling algorithm based on chaos theory and sorting transformation. IJCSNS International Journal of Computer Science and Network Security, 8, 64-68.

Li, S., Zhao, Y. Qu, B., & Wang, J. (2013). Image scrambling based on chaotic sequences and vigenere cipher. Multimedia Tools and Applications, 66 , 573-588.

Carrillo, P., Kalva, H., & Magliveras, S. (2010). Compression independent reversible encryption for privacy in video surveillance. EURASIP Journal on Information Security, 2009 , 1-13. doi:10.1155/2009/429581. Article ID:2009:429581.

F. Dufaux and T. Ebrahimi, H. 264/AVC video scrambling for privacy protection, in Proc. IEEE Int. Cont Image Process., Oct. 2008, pp. 1688-1691.

F. Dufaux, Video scrambling for privacy protection in video surveillance: Recent results and validation framework, Proc. SPIE, vol. 8063,pp. 307-314, May 2011.

L. Tong, F. Dai, Y. Zhang, and J. Li, Restricted H264/AVC video coding for privacy region scrambling, in Proc. IEEE Int. Conf. Image Process., Sep. 2010, pp. 2089-2092.

J. Jiang, Y. Liu, Z. Su, and G. Zhang, An improved selective encryption for H.264 video based on intra prediction mode scrambling, J. Multimedia, vol. 5, No. 5, pp. 464-472, 2010.

P. Korshunov and T. Ebrahimi, Using warping for privacy protection in video surveillance, in Proc. Int. Conf. Digit. Signal Process., 2013, pp. 1-6.

J. Lopez, A. Chaaraoui and F. Revuelta, Visual privacy protection methods: A survey, in Expert Systems with Applications, Jun. 1, 2015, pp. 4177-4195.

Wikpedia, "Region of Interest", Retrieved from "https://en.wikipedia.org/w/index.php?title=Region_of_interest&oldid=937446178", This page was last edited on Jan. 25, 2020, at 02:21 (UTC).

Wikipedia, "OpenCV", Retrieved from "https://en.wikipedia.org/w/index.php?title=OpenCV&oldid=942899990", This page was last edited on Feb. 27, 2020, at 15:48 (UTC).

\* cited by examiner

VEHICLE PASSENGER DETECTION SYSTEM AND METHOD

TECHNICAL FIELD

Embodiments are related to vehicle passenger detection systems and methods. Embodiments further relate to reversible face redaction for use with a vehicle passenger detection system.

BACKGROUND

A Vehicle Passenger Detection System (VPDS) can be utilized to automatically count the number of passengers within a vehicle using the images captured by a roadside system. Although passengers might be identifiable in these images, identifying passengers in this manner may be considered an obstruction of privacy and hence, it may be necessary to mask the identity of the passengers. Additionally, at times law enforcement might retrieve the original images in order to provide the violator with proof of violation through imagery.

Another concern with VPDS applications is that although a number of computer vision applications may be utilized to capture images and identifying vehicle passengers, such applications may not be effectively implemented in the "real world" due to concerns related to privacy protection. It has become imperative, for example, to obfuscate personally identifiable and sensitive information in order to realize the full potential of computer vision applications. A need thus exists for face redaction solutions that can lead to implementation of devices/systems such as VPDS applications, devices that can assist the elderly and children at home or other places, and devices that may assist people in, for example, malls or other public and/or private places (e.g., ambient assisted living), and so on, without violating any privacy related laws.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a vehicle passenger detection system and method.

It is another aspect of the disclosed embodiments to provide for methods and systems for face redaction for use in a vehicle passenger detection system.

It is a further aspect of the disclosed embodiments to provide for the reconstruction of redacted images, while maintaining the privacy of individuals shown in the redacted images.

The aforementioned aspects and other objectives and advantages can now be achieved as described herein. In an embodiment, a method for image processing of an image captured by an image-capturing device, can involve: dividing a region of interest in an image into a plurality of blocks, wherein the image is captured by an image-capturing device, and the region of interest is associated with at least one face in the image, and wherein a resulting division of the dividing of the region of interest is non-uniform; defining a minimum block size with respect to the each block and a plurality of coordinates of the each block after the dividing of the region of interest in the image in the plurality of blocks; and redacting and reconstructing the at least one face in the image using the plurality of coordinates, wherein the redacting and reconstructing of the image is reversible for a redaction and a reconstruction of the image for detecting the at least one face in the image.

In an embodiment of the method, the plurality of coordinates can specify top left coordinates and bottom right coordinates of the each block.

An embodiment of the method can further involve scrambling each block among the plurality of blocks prior to the defining of the minimum block size.

In an embodiment of the method, the region of interest can comprise an output from a face detector.

In an embodiment of the method, redacting and reconstructing the at least one face in the image using the plurality of coordinates, can further involve: processing a first routine for redacting the at least one face in the image to generate a redaction of the at least one face in the image.

In an embodiment of the method, redacting and reconstructing the at least one face in the image using the plurality of coordinates, can further involve: processing a second routine for reversing the redaction and reconstructing an original image of the image.

In an embodiment of the method, redacting and reconstructing the at least one face in the image using the plurality of coordinates, can further involve: processing a first routine for redacting the at least one face in the image to generate a redaction of the at least one face in the image; and processing a second routine for reversing the redaction and reconstructing an original image of the image.

In another embodiment, a system for image processing of an image captured by an image-capturing device, can include at least one processor and a memory, the memory storing instructions to cause the at least one processor to perform: dividing a region of interest in an image into a plurality of blocks, wherein the image is captured by an image-capturing device, and the region of interest is associated with at least one face in the image, and wherein a resulting division of the dividing of the region of interest is non-uniform; defining a minimum block size with respect to the each block and a plurality of coordinates of the each block after the dividing of the region of interest in the image in the plurality of blocks; and redacting and reconstructing the at least one face in the image using the plurality of coordinates, wherein the redacting and reconstructing of the image is reversible for a redaction and a reconstruction of the image for detecting the at least one face in the image.

In an embodiment of the system, the plurality of coordinates can specify top left coordinates and bottom right coordinates of the each block.

In an embodiment of the system, the instructions can further comprise instructions configured for scrambling each block among the plurality of blocks prior to the defining of the minimum block size.

In an embodiment of the system, the region of interest can comprise an output from a face detector.

In an embodiment of the system, the instructions for redacting and reconstructing the at least one face in the image using the plurality of coordinates, can further comprise instructions configured for: processing a first routine for redacting the at least one face in the image to generate a redaction of the at least one face in the image.

In an embodiment of the system, the instructions for redacting and reconstructing the at least one face in the image using the plurality of coordinates, can further comprise instructions configured for: processing a second routine for reversing the redaction and reconstructing an original image of the image.

In an embodiment of the system, the instructions for redacting and reconstructing the at least one face in the image using the plurality of coordinates, can further comprise instructions configured for: processing a first routine for redacting the at least one face in the image to generate a redaction of the at least one face in the image; and processing a second routine for reversing the redaction and reconstructing an original image of the image.

In another embodiment, a system for image processing of an image captured by an image-capturing device, can comprise an image-capturing device wherein a region of interest in an image captured by the image-capturing device is divided into a plurality of blocks, wherein the region of interest is associated with at least one face in the image, and wherein a resulting division of the dividing of the region of interest is non-uniform; and a face detector associated with the image-capturing device, wherein the region of interest comprises an output from the face detector, wherein a minimum block size is defined with respect to the each block and a plurality of coordinates of the each block after the dividing of the region of interest in the image in the plurality of blocks, and wherein the at least one face in the image is redactable and reconstructable using the plurality of coordinates, wherein redacting and reconstructing of the image is reversible for detecting the at least one face in the image. As discussed previously, in some embodiments, the plurality of coordinates can specify top left coordinates and bottom right coordinates of the each block, and each block among the plurality of blocks can be scrambled prior to the defining of the minimum block size.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
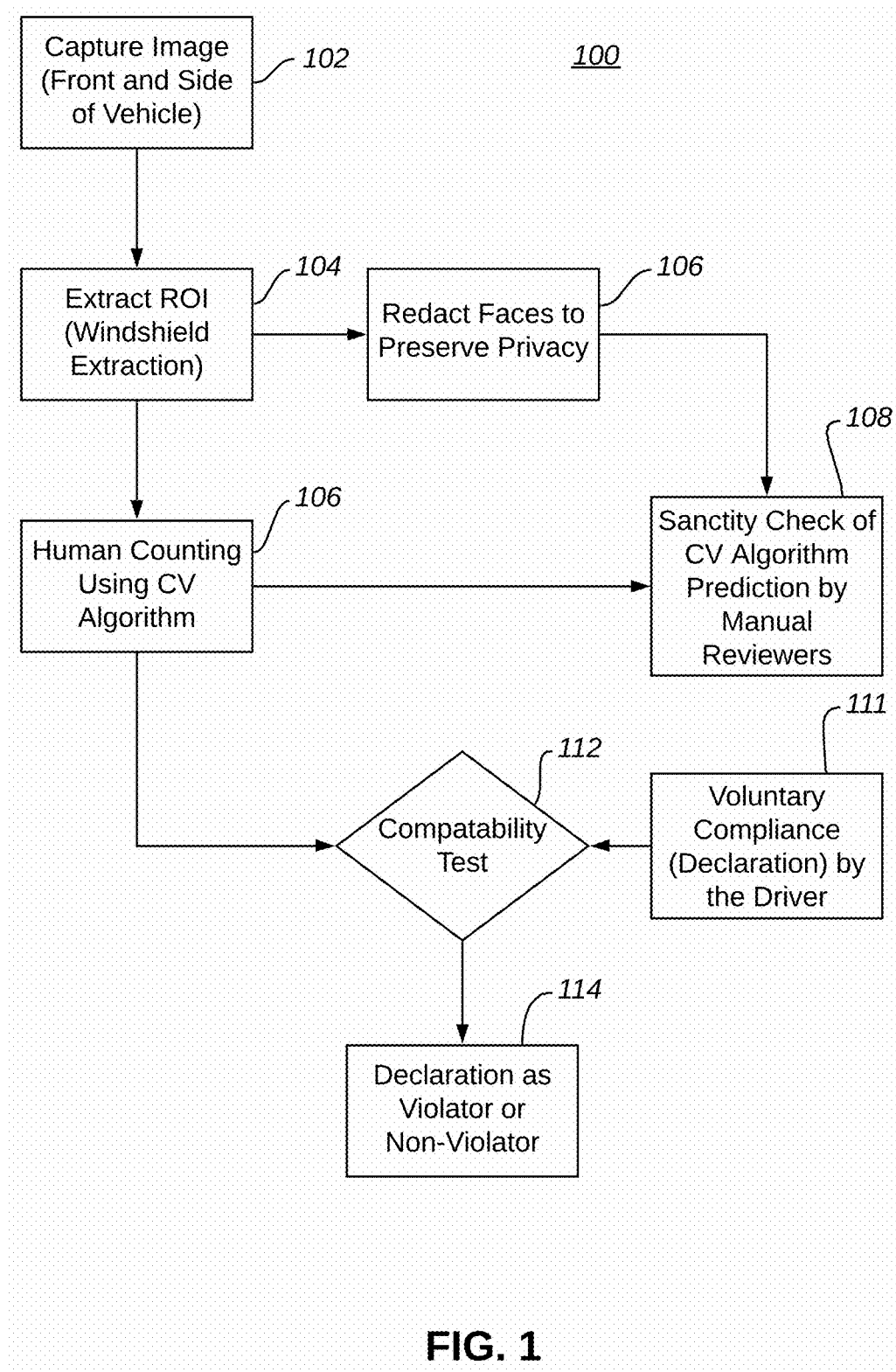
FIG. 1 illustrates a flow diagram depicting logical operational steps of a method for reversible face redaction, which can be incorporated into a Vehicle Passenger Detection System (VPDS), in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods can be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software can depend upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" can be an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 illustrates a flow diagram depicting logical operational steps of a method 100 for reversible face redaction, which can be incorporated into a vehicle passenger detection system (e.g., such as the VPDS shown in FIG. 6) in accordance with an embodiment. Note that the term redaction as utilized herein can relate to protecting sensitive visual information from an image by modifying or removing a region of interest (ROI) from the image. The term region of interest (often referred to as "ROI") as utilized herein can relate to samples within a data set that can be identified for a particular purpose.

As shown at block 102 in FIG. 1, a step or operation can be implemented for capturing an image of the front side and the right (or left) side of a vehicle. Next, as shown at block 104, a step or operation can be implemented to extract the ROI from the image (e.g., windshield extraction). Following processing of the operation depicted at block 104, two paths are possible. In a first path, a step or operation as depicted at block 106 can be implemented to redact faces to preserve privacy. Next, as shown at block 108, a step or operation can be implemented to perform a sanctity check of a computer vision (CV) algorithm prediction by a manual reviewer.

Note that an example of a CV algorithm that can be adapted for use with some embodiments is an open source computer vision (OpenCV) programming function. The term "OpenCV" as utilized herein can refer to a library of programming functions for real-time computer vision applications. OpenCV can support models from deep learning frameworks like TensorFlow, Torch, PyTorch and Caffe according to a defined list of supported layers. It can be appreciated that reference to OpenCV is for exemplary purposes only and is not considered a limiting feature of the disclosed embodiments. Other types of CV algorithms and applications may be adapted for use with different embodiments.

In a second path, after processing of the operation depicted at block 104, a step or operation can be implemented for human counting the CV algorithm, as shown at block 106. Thereafter, as indicated at decision block 112, a compatibility test can be performed, which can test the compatibility of data generated as a result of the operation shown at block 111 (i.e., voluntary compliance (declaration) by a driver), data generated as a result of the processing operation shown at block 106. Following implementation of the compatibility test depicted at block 112, a test can be performed to declare the person in the captured image as a violator or a non-violator.

Figure 2:
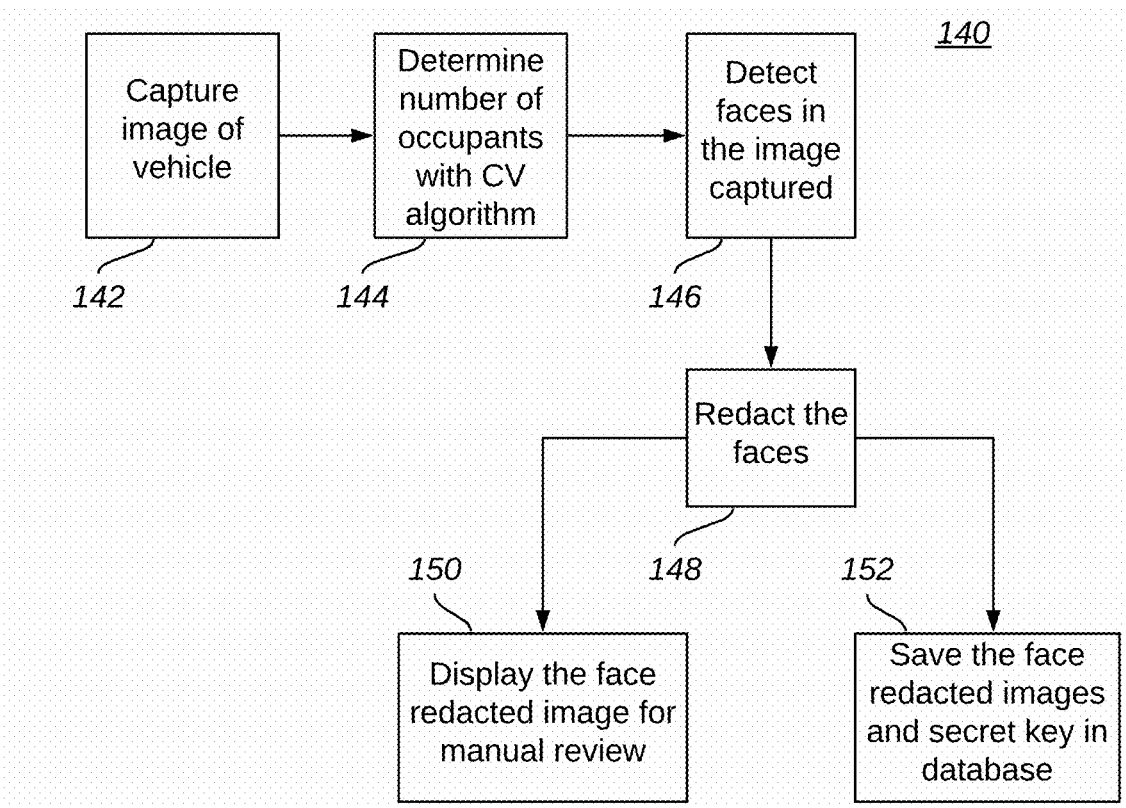
FIG. 2 illustrates a flow diagram depicting logical operational steps of a method for redacting images for privacy protection, in accordance with an embodiment.
Figure 3:
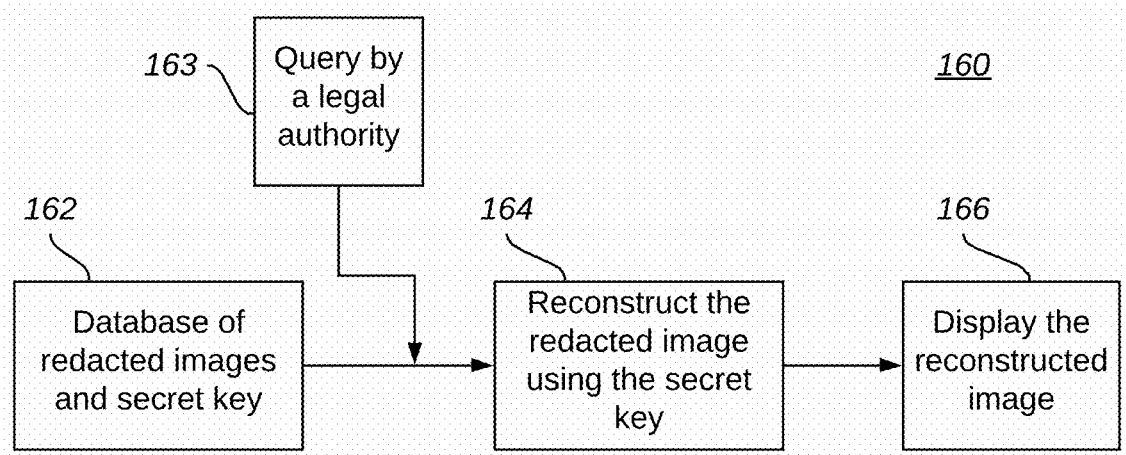
FIG. 3 illustrates a flow diagram depicting logical operational steps of a method for reconstructing redacted images, in accordance with an embodiment.

FIG. 2 illustrates a flow diagram depicting logical operational steps of a method 140 for redacting images for privacy protection, in accordance with an embodiment. As shown at block 142, a step or operation can be implemented for capturing an image of a vehicle. Thereafter, as shown at block 144, a step or operation can be implemented for determining the number of occupants of the vehicle shown in the image using the CV algorithm FIG. 3 illustrates a flow diagram depicting logical operational steps of a method 160 for reconstructing redacted images, in accordance with an embodiment. As shown at blocks 162 and 163, steps or operations can be implemented in which a database of redacted images and a secret key(s) is queried by a legal authority (an example of such a database of redacted images and secret key(s) is the database 230 shown in FIG. 6). Then, as depicted at block 164, a step or operation can be implemented in which the redacted image can be reconstructed utilizing the secret key. Thereafter, as illustrated at block 166, the reconstructed image can be displayed.

The disclosed embodiments can be implemented in the context of an algorithm for redacting faces in an image and an algorithm that can reverse the redaction and reconstruct the original image. The coordinates of the faces in the image can be obtained using a face detection method. The disclosed algorithm can thus take a secret key (e.g., a hexadecimal string of length n where n is any even integer) and an integer, which can indicate the minimum size of the block.

In such an algorithm, the ROI, which can be the output of a face detector, can be first divided into a number of blocks and then scrambling can be applied on each block. A minimum blocks size n can be defined. Each block can be then of a size approximately n×n. The division of the ROI into these blocks may not be uniform. Hence, we need a list of set of two co-ordinates, each set specifying the top left and bottom right co-ordinates of a block. The redaction and reconstruction algorithms mentioned above and the algorithm to obtain the co-ordinates of blocks of variable sizes are presented below.

Figure 4:
FIG. 4 illustrates a group of images depicting the redaction and reconstruction of some images obtained from a VPDS from a customer site, with a minimum block size equal to 10 using Algorithms 1 and 2, in accordance with an embodiment.

Algorithm 1: Algorithm for face redaction using block-wise scrambling with blocks of variable sizes Input: 1. Input image I
2. Co-ordinates of ROI (can be more than one ROI) or output of face detector
3. Minimum block size n
4. k-bit encryption key E, where k is a multiple of 4, in the form of k/4 hexadecimal digits.
Output: Output image J where all input ROIs are redacted
Step1: Initialize the output image J with same values as the input image I
Step2: Consider the first k/8 digits of E and call it $E_b$ and let the last 8 digits of E be called $E_s$
Step3: Consider the pair of co-ordinates (p1, q1) and (p2, q2) representing an ROI
Step4: Divide the ROI into blocks of variable sizes, using Algorithm3, using n as the minimum blocksize and the key $E_b$.
Step5: Set a counter ctr to 0. This will track the digit we are using from the encryption key for scrambling
Step6: For each block b:
    Use $E_s$[ctr] as seed to generate random permutation π of the co-ordinates of the block b
    Scramble the pixel values of the block b as J(x, y)=I(π(x, y))
    Increment the ctr as ctr=(ctr+1) mod (k/8)
Step7: Replace J(p1:p2, q1:q2) with the output of step6
Step8: Consider the next pair of co-ordinates representing another ROI. Repeat steps 3 through 7 till all ROIs are processed.
Step9: Save/display the output image J
Algorithm2: Algorithm for reconstruction of face redacted image using block-wise scrambling with blocks of variable sizes
Input: 1. Face redacted input image I
2. Co-ordinates of ROI (can be more than one ROI) or output of face detector
3. Minimum block size n
4. k-bit encryption key E, where k is a multiple of 4, in the form of k/4 hexadecimal digits.
Step1: Initialize the output image J with same values as the input image I
Step2: Consider the first k/8 digits of E and call it $E_b$ and let the last 8 digits of E be called $E_s$
Step3: Consider the pair of co-ordinates (p1, q1) and (p2, q2) representing an ROI
Step4: Divide the ROI into blocks of variable sizes, using Algorithm3, using n as the minimum blocksize and the key $E_b$.
Step5: Set a counter ctr to 0. This will track the digit we are using from the encryption key for scrambling
Step6: For each block b:
    Use $E_s$[ctr] as seed to generate random permutation π of the co-ordinates of the block b
    Find the reverse of π, that is, $π^{-1}$ as argsort(π)
    Scramble the pixel values of the block b as J(x, y)=I($π^{-1}$(x, y))
    Increment the ctr as ctr=(ctr+1) mod (k/8)
Step7: Replace J(p1:p2, q1:q2) with the output of step6
Step8: Consider the next pair of co-ordinates representing another ROI. Repeat steps 3 through 7 till all ROIs are processed.
Step9: Save/display the output image J
Algorithm3: Algorithm to obtain blocks of variable sizes
Input: 1. Dimensions of input image—(h, w)
2. Minimum block size n
3. k-bit encryption key $E_b$, where k is a multiple of 4, in the form of k/4 hexadecimal digits.
Output: A list B containing pair of co-ordinates, each pair representing top left and bottom right co-ordinates of a block
Step1: Initialize the list B=[ ]
Step2: Let bias be p. It can either be n or n/2 or any fraction of n.
Step3: $E_b$=[(e mod β) fore in $E_b$]
Step4: $E_b$=$E_b$−int(β/2)
Step5: Top left co-ordinate is TL=(0, 0) and bottom right co-ordinate is BR=(w, h)
Step6: Set a counter ctr to 0.
Step7: Call function ƒ with ctr, TL and BR as input.
Step8: Function ƒ: step_offset is $E_b$[ctr]
Step9: Function ƒ(continued): Let H=[1]−TL[1] and W=BR[0]−TK[0]
Step10: Function ƒ(continued): If H>W, let orientation='horizontal', else, orientation='vertical'.
Step11: Function ƒ(continued):
If orientation='horizontal',
    Mid-point m=(TL[1]+BR[1])/2
    Create two regions R1 with top left co-ordinate as TL and bottom right co-ordinate as (BR[0], m) and R2 with top left co-ordinate as (TL[0], m) and bottom right co-ordinate as BR
Else, if orientation='vertical',
    Mid-point m=(TL[0]+BR[0])/2
    Create two regions R1 with top left co-ordinate as TL and bottom right co-ordinate as (m, BR[1]) and R2 with top left co-ordinate as (m, TL[1]) and bottom right co-ordinate as BR
Step12: Function ƒ(continued): If height or width of either R1 or R2 is less than n, append the co-ordinates of R1 and R2 to B and return True, else, continue.
Step13: Function ƒ(continued): If orientation='vertical', change it to 'horizontal', else, make it 'vertical'.
Step14: Function ƒ(continued): Increment ctr as ctr=(ctr+1) mod (k/4)
Step15: Function ƒ(continued): Let TL and BR be the top left and bottom right co-ordinates of R1. Call function ƒ with ctr, TL and BR as input.
Step16: Function ƒ(continued): Increment ctr as ctr=(ctr+1) mod (k/4)
Step17: Function ƒ(continued): Let TL and BR be the top left and bottom right co-ordinates of R2. Call function ƒ with ctr, TL and BR as input.
Step18: Return the list B FIG. 4 illustrates a group of images 180 depicting the redaction and reconstruction of some images obtained from a VPDS from a customer site, with a minimum block size equal to 10 using Algorithms 1 and 2, in accordance with an embodiment. FIG. 4 thus depicts some examples of redaction and reconstruction of images captured by a VPDS that utilizes the disclosed approach. As can be seen in FIG. 4, the group of images 180 is intelligible and it is possible to count the number of faces in the redacted images. Also, the reconstructed images are lossless and there are no artifacts either.

Figure 5:
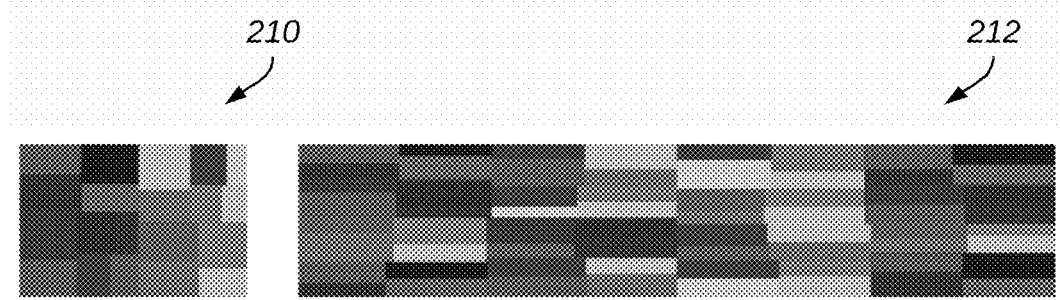
FIG. 5 illustrates two examples of generation of blocks of variable sizes using Algorithm 3, in accordance with an embodiment.

FIG. 5 illustrates two examples images 210 and 212 depicting the generation of blocks of variable sizes using Algorithm 3, in accordance with an embodiment. FIG. 5 depicts two examples 210 and 212 of dividing the bigger rectangular region into smaller blocks of variable sizes.

Figure 6:
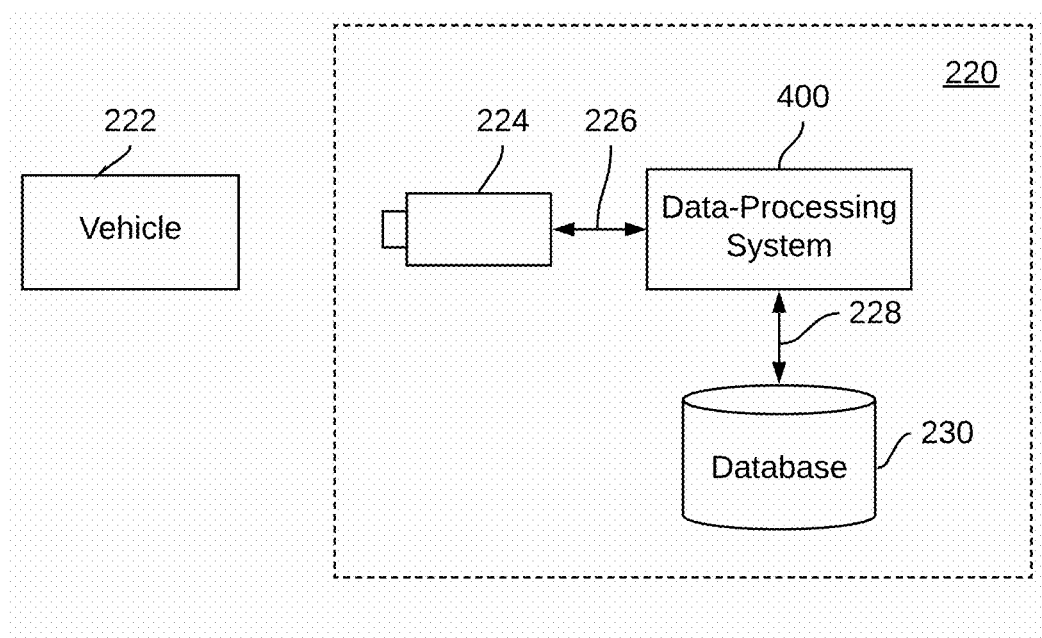
FIG. 6 illustrates a block diagram depicting a VPDS, in accordance with an embodiment.

FIG. 6 illustrates a block diagram depicting a vehicle passenger detection system 220, in accordance with an embodiment. The vehicle passenger detection system 220 shown in FIG. 6 can include an image-capturing device 224 that can communicate bidirectionally with a data-processing system 400 as indicated by arrow 226. The bidirectional communications between the data-processing system 400 and the image-capturing device 224 can be facilitated by, for example, direct-wired communications or through wireless communications (e.g., cellular networks, Wi-Fi, etc). The data-processing system 400 can communicate, as indicated by arrow 228, with a database 230. Communications between the data-processing system 400 and the database 230 may also occur through direct-wired communications or through wireless communications.

Based on the foregoing, it can be appreciated that the disclosed embodiments offer a number of advantages. For example, the embodiments including the disclosed algorithms can be completely reversible and hence there is no loss of data. In other words, the disclosed embodiments comprise a lossless redaction algorithm. Additionally, the images redacted using the disclosed embodiments are intelligible along with having the ability to protect sensitive information. When the personally identifiable and sensitive information in the image is reduced while retaining the context of the image, the image can be said to be intelligible.

By performing the blockwise scrambling of the disclosed embodiments, we can retain the intelligibility of the images. The intelligibility, however, may decrease as we increase the minimum size of the block. In addition, by varying the size of the encryption key, we can vary the strength of redaction. The disclosed redaction approach can be applied to both color and grayscale images. In addition, using rectangular blocks of variable sizes can result in a stronger encryption than using the rectangular blocks of uniform size.

Because the disclosed embodiments can be is used for face redaction, we can assume that the aspect ratio of ROI may be close to 1. Hence, we can conclude that the size of each blocks can be approximately n×n where n is the minimum block size. If the aspect ratio of the ROI is not close 1, by using the disclosed approach for generating coordinates for blocks of variable sizes, we can obtain blocks with aspect ratios closer to that of the ROI.

A reversible face redaction algorithm can be incorporated in a VPDS such as the vehicle passenger detection system 220, as discussed herein. If the face redaction can be reversed based on a secret key, it will be useful for the law enforcement agencies when there is a need to identify a person if there are incidents of a crime or any unusual activities. If the algorithm is strong enough, it will be very difficult for any person to reverse the redaction, without access to the secret key. If the context of the image can be retained even after obscuring the sensitive/identifiable information in the image, then the redacted image can be said to be intelligible. In the disclosed embodiments, we also aim to retain the intelligibility of the image.

It should be appreciated that although embodiments have been discussed herein, which relate to VPDS applications, the disclosed embodiments can be implemented in other contexts, such as, for example, systems that can assist the elderly and children at home or other places, and devices that may assist people in, for example, malls or other public and/or private places (e.g., ambient assisted living), and so on, without violating any privacy related laws.

The disclosed embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of image processing images captured by an image-capturing device, such as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means, which can implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 7:
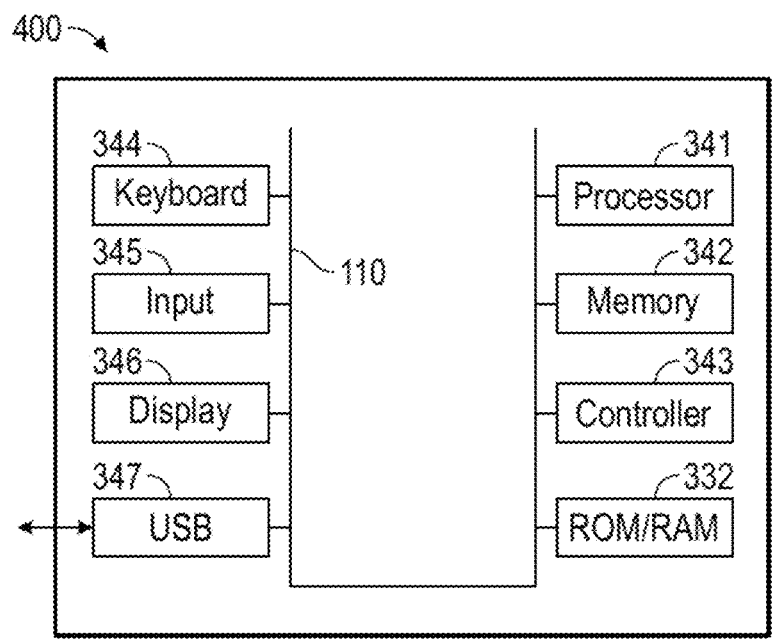
FIG. 7 illustrates a schematic view of a data-processing system, in accordance with an embodiment.
Figure 8:
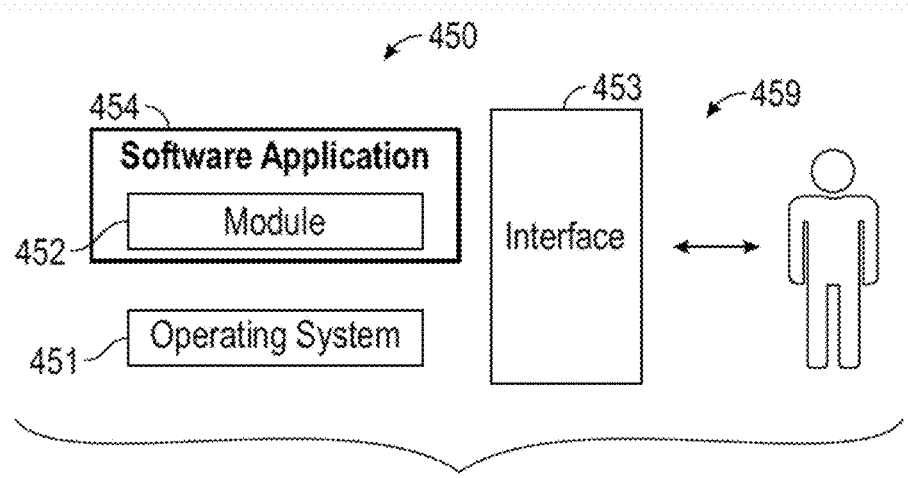
FIG. 8 illustrates a schematic view of a software system including a module, an operating system, and a user interface, in accordance with an embodiment.

FIG. 7 and FIG. 8 are shown only as exemplary diagrams of data-processing environments in which example embodiments may be implemented. It should be appreciated that FIG. 7 and FIG. 8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components. The database 114 illustrated and discussed previously herein may in some embodiments be located with, for example, the memory 342 or another memory.

The system bus 110 can serve as a main electronic information highway interconnecting the other illustrated components of the hardware of data-processing system 400. The system bus 110 can function as a communication system that transfers data between components inside the data-processing system 400 (e.g., a computer), or between computers. The system bus 110 can include all related hardware components (wire, optical fiber, etc.) and software, including communication protocols.

In some embodiments, the processor 341 may be a CPU that functions as the central processing unit of the data-processing system 400, performing calculations and logic operations required to execute a program. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 8 illustrates a computer software system 450 for directing the operation of the data-processing system 400 depicted in FIG. 7. The software application 454, may be stored for example in memory 342 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions, operations and algorithms such as those discussed herein. For example, the module 452 can implement the steps or operations illustrated and described herein with respect to the various blocks shown in FIG. 1, FIG. 2, and FIG. 3, and Algorithm 1, Algorithm 2, and Algorithm 3.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module as utilized may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 7.

The disclosed embodiments can constitute an improvement to a computer system (e.g., such as the data-processing system 400 shown in FIG. 7) rather than simply the use of the computer system as a tool. The disclosed modules, instructions, steps and functionalities discussed herein can result in a specific improvement over prior systems, resulting in improved data-processing systems.

FIG. 7 and FIG. 8 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The disclosed embodiments require less time for processing and also fewer resources in terms of memory and processing power in the underlying computer technology. Such improvements can result from implementations of the disclosed embodiments. The claimed solution may be rooted in computer technology in order to overcome a problem specifically arising in the realm of computers and computer networks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for image processing of an image captured by an image-capturing device, comprising:
    dividing a region of interest in an image into a plurality of blocks, wherein the image is captured by an image-capturing device, and the region of interest is associated with at least one face in the image, and wherein a resulting division of the dividing of the region of interest is non-uniform;
    defining a minimum block size with respect to the each block and a plurality of coordinates of the each block after the dividing of the region of interest in the image in the plurality of blocks; and
    redacting and reconstructing the at least one face in the image using the plurality of coordinates, wherein the redacting and reconstructing of the image is reversible for a redaction and a reconstruction of the image for detecting the at least one face in the image.

2. The method of claim 1 wherein the plurality of coordinates specifies top left coordinates and bottom right coordinates of the each block.

3. The method of claim 1 further comprising scrambling each block among the plurality of blocks prior to the defining of the minimum block size.

4. The method of claim 1 wherein the region of interest comprises an output from a face detector.

5. The method of claim 1 wherein redacting and reconstructing the at least one face in the image using the plurality of coordinates, further comprises:
    processing a first routine for redacting the at least one face in the image to generate a redaction of the at least one face in the image.

6. The method of claim 5 wherein redacting and reconstructing the at least one face in the image using the plurality of coordinates, further comprises:
    processing a second routine for reversing the redaction and reconstructing an original image of the image.

7. The method of claim 1 wherein redacting and reconstructing the at least one face in the image using the plurality of coordinates, further comprises:
    processing a first routine for redacting the at least one face in the image to generate a redaction of the at least one face in the image; and
    processing a second routine for reversing the redaction and reconstructing an original image of the image.

8. A system for image processing of an image captured by an image-capturing device, comprising:
    at least one processor and a memory, the memory storing instructions to cause the at least one processor to perform:
        dividing a region of interest in an image into a plurality of blocks, wherein the image is captured by an image-capturing device, and the region of interest is associated with at least one face in the image, and wherein a resulting division of the dividing of the region of interest is non-uniform;
        defining a minimum block size with respect to the each block and a plurality of coordinates of the each block after the dividing of the region of interest in the image in the plurality of blocks; and
        redacting and reconstructing the at least one face in the image using the plurality of coordinates, wherein the redacting and reconstructing of the image is reversible for a redaction and a reconstruction of the image for the at least one face detected in the image.

9. The system of claim 8 wherein the plurality of coordinates specifies top left coordinates and bottom right coordinates of the each block.

10. The system of claim 8 wherein the instructions further comprise instructions configured for scrambling each block among the plurality of blocks prior to the defining of the minimum block size.

11. The system of claim 8 wherein the region of interest comprises an output from a face detector.

12. The system of claim 8 wherein the instructions for redacting and reconstructing the at least one face in the image using the plurality of coordinates, further comprise instructions configured for:
processing a first routine for redacting the at least one face in the image to generate a redaction of the at least one face in the image.

13. The system of claim 12 wherein the instructions for redacting and reconstructing the at least one face in the image using the plurality of coordinates, further comprise instructions configured for:
processing a second routine for reversing the redaction and reconstructing an original image of the image.

14. The system of claim 8 wherein the instructions for redacting and reconstructing the at least one face in the image using the plurality of coordinates, further comprise instructions configured for:
processing a first routine for redacting the at least one face in the image to generate a redaction of the at least one face in the image; and
processing a second routine for reversing the redaction and reconstructing an original image of the image.

15. A system for image processing of an image captured by an image-capturing device, comprising:
an image-capturing device wherein a region of interest in an image captured by the image-capturing device is divided into a plurality of blocks, wherein the region of interest is associated with at least one face in the image, and wherein a resulting division of the dividing of the region of interest is non-uniform; and
a face detector associated with the image-capturing device, wherein the region of interest comprises an output from the face detector, wherein a minimum block size is defined with respect to the each block and a plurality of coordinates of the each block after the dividing of the region of interest in the image in the plurality of blocks, and wherein the at least one face in the image is redactable and reconstructable using the plurality of coordinates, wherein redacting and reconstructing of the image is reversible for detecting the at least one face in the image.

16. The system of claim 15 wherein the plurality of coordinates specifies top left coordinates and bottom right coordinates of the each block.

17. The system of claim 15 wherein each block among the plurality of blocks is scrambled after the defining of the minimum block size.

18. The system of claim 15 wherein a first routine is processed for redacting the at least one face in the image to generate a redaction of the at least one face in the image.

19. The system of claim 18 wherein a second routine is processed for reversing the redaction and reconstructing an original image of the image.

20. The system of claim 15 wherein:
a first routine is processed for redacting the at least one face in the image to generate a redaction of the at least one face in the image; and
a second routine is processed for reversing the redaction and reconstructing an original image of the image.

* * * * *